Dec. 16, 1924.　　　　　　　　　　　　　　　　　　　　　　　1,519,798
E. J. PILKINGTON ET AL
DRINK MIXER AND SIMILAR DEVICE
Original Filed Sept. 15, 1921
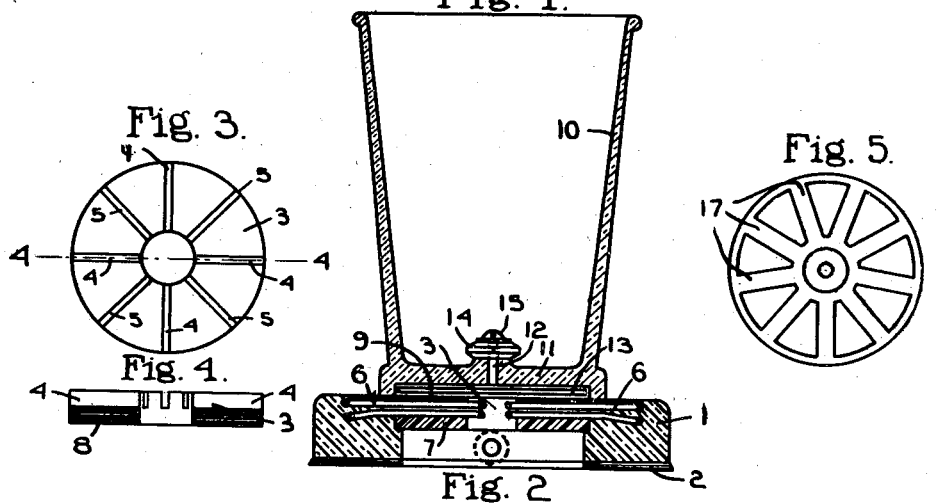
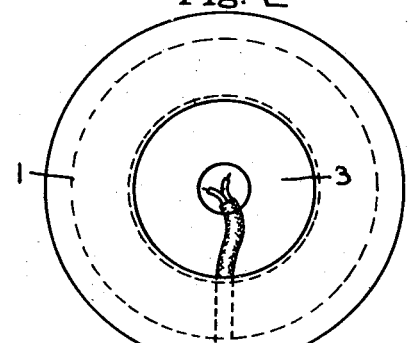
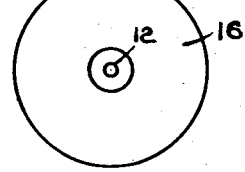
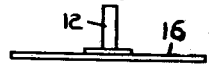
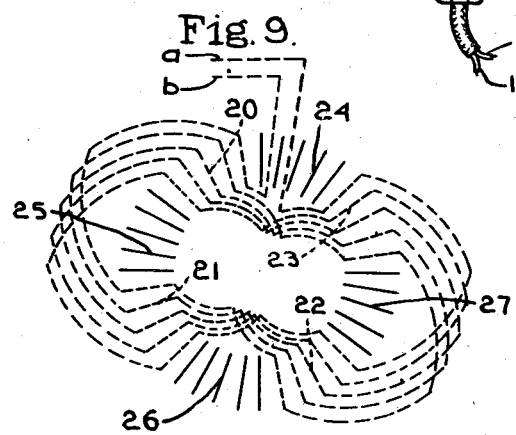
INVENTORS
Earl J. Pilkington
Francis A. Olmsted
by
Heard Smith & Tennant ATTORNEYS Patented Dec. 16, 1924.

1,519,798

UNITED STATES PATENT OFFICE.

EARL J. PILKINGTON, OF CAMBRIDGE, AND FRANCIS A. OLMSTED, OF EVERETT, MASSACHUSETTS.

DRINK MIXER AND SIMILAR DEVICE.

Application filed September 15, 1921, Serial No. 500,936. Renewed October 31, 1924.

*To all whom it may concern:*

Be it known that we, EARL J. PILKINGTON and FRANCIS A. OLMSTED, both citizens of the United States, and residents of (1) Cambridge, county of Middlesex, State of Massachusetts, and (2) Everett, county of Middlesex, State of Massachusetts, have invented an Improvement in Drink Mixers and Similar Devices, of which the following description, in connection with the accompanying drawing, is a specification, like characters on the drawing representing like parts.

This invention relates to improvements in motor propelled devices in which a movable instrumentality is actuated by an induction motor impelled by a suitable current, as by a single phase or polyphase alternating current.

One of the principal objects of the invention is to provide a motor propelled device of the character described comprising independent complementary members embodying respectively the stator and rotor of an induction motor adapted when juxtaposed coaxially to establish a relation between the stator and rotor operable to cause an electric current impressed upon one of said motor members, preferably the field windings of said stator, to actuate said rotor and thereby operate the movable instrumentality.

A further object of the invention is to provide a device of the character described with complementary members, one of which embodies a stator of an induction motor, presenting a substantially flat surface, and the other of which embodies a disk-like rotor adapted when juxtaposed coaxially upon said stator, and an electric current impressed in the field windings of said stator, to cause a rotation of said rotor.

More specifically the invention relates to improvements in mixers for liquids, and other materials, in which a suitable base is provided with a preferably flat stator of an induction motor, and a receptacle, for the liquid or other materials, which is independent of said base, is provided with a rotor having a shaft extending into the receptacle provided with a stirrer.

These and other objects and features of the invention will more fully appear from the following description and the accompanying drawings and will be pointed out in the claims.

A preferred embodiment of the invention is illustrated in the accompanying drawings as applied to a drink mixer.

In the drawings:

Fig. 1 is a median, vertical, sectional view through a drink mixing apparatus embodying the invention, the rotor, its shaft, and stirrer being shown in elevation;

Fig. 2 is an underneath plan view of the same;

Fig. 3 is a plan view of the stator;

Fig. 4 is a vertical sectional view of the stator on line 4—4, Fig. 3;

Fig. 5 is a plan view of the preferred rotor in the form of a skeletonized disk.

Fig. 6 is a side elevation of the same;

Fig. 7 is a plan view of a modified rotor in the form of a solid disk;

Fig. 8 is a side elevation of the same;

Fig. 9 is a diagrammatic illustration of a preferred form of two-phase field winding for the stator, the winding of one phase being illustrated in dotted lines, while the winding for the other phase is not illustrated except by graphic illustrations of the slots in the stator in which the windings are located.

The specific embodiment of the invention illustrated herein is designed to provide a motor which can be operated by a pulsating current, or by a single phase, or multiphase alternating current to actuate the stirrer of a drink mixer, such as are employed at soda fountains, or for the purpose of operating analogous devices.

One of the objects of the invention is to produce a motor of relatively simple construction and operation to present a compact and neat appearance and which will not require so great care and upkeep, or be liable to short circuiting on account of moisture.

Another feature of the invention consists in the production of an induction motor of the character specified in which the stator is embedded in a base and presents a substantially flat surface, and the rotor is carried by a receptacle, or other member, independent of the stator, the rotor being preferably of disk-like form. It will, however, be understood that the term "disk-like" is not necessarily limited to a disk presenting a flat surface, but is intended to include any form of disk-like construction, whether the same be flat, concave or convex, and that the stator may be of a form complementary to said rotor.

As illustrated in the accompanying drawing the drink mixing device comprises a base 1 of insulating material, such as vulcanized rubber or bakelite, or other suitable material, preferably having upon its bottom a cushioning member 2 of felt or similar material and having embedded in its upper surface the stator of an induction motor. The stator preferably comprises a cylindrical member 3 having suitable series of alternating radial slots 4 and 5 adapted to receive respectively the field windings 6 of a two-phase alternating current. The stator may be provided with a solid core 7 underlying the field windings, as illustrated in Fig. 1, or with a laminated core 8, as illustrated in Fig. 4. The windings of the rotor may extend beyond the core into suitable slots in the base 3. The field windings of the stator desirably are so formed that the upper surface of the stator may present a substantially flat surface 9 upon which the other member of the device, such as the receptacle for the liquid or other material to be mixed, may be superimposed.

As illustrated herein the receptacle is in the form of a glass 10 having a bottom 11 provided with a central aperture in which the shaft 12 of the rotor is journalled. The lower face of the bottom is provided with a recess to receive the disk-like rotor 13 which is fixedly secured to the shaft. A stirrer, preferably in the form of an hexagonal member 14, is secured to the upper end of the rotor shaft by a screw 15 and serves the double purpose of supporting the rotor shaft and of providing a stirrer for the liquid contained in the receptacle.

The rotor desirably is in the form of a flat disk. It may be a solid disk 16 as illustrated in Figs. 7 and 8, but preferably is in the form of a skeletonized disk as illustrated in Fig. 5, in which it is shown as having radial arms 17 unequal in number to the slots in which the field windings of the stator are located to avoid a dead point.

The current is supplied to the stator from a suitable generator through a suitable number of conductors 18 and 19 adapted to the character of current which is to be supplied to the stator, in accordance with the usual stator windings for a single phase or multi-phase current as the case may be.

The winding of the stator for a two-phase current is illustrated in Fig. 9 in which, however, only one of the windings is illustrated by the dotted lines $a$ and $b$. The straight or radial portions 20, 21, 22 and 23 of the dotted lines represent the portion of the winding which passes through the slots in the stator disk, while the curved portions graphically illustrate the "heads" or portions of the winding which extend from one of the slots to another. The groups of radial full lines 24, 25, 26 and 27 represent the slots through which the winding for the other phase of the current is carried, the winding itself being the same as that illustrated by the dotted lines $a$ and $b$.

In the operation of the device a suitable current corresponding to the requirements of the winding of the stator is impressed upon the stator. The receptacle or other device which carries the rotor is then superimposed upon the base which carries the stator in such a manner that the rotor will be juxtaposed coaxially upon the stator. The current which is impressed upon the motor creates a rotary magnetic field which will cause rotation of the rotor in accordance with the operation of usual types of induction motors which is well understood and need not be further described.

The rotation of the rotor causes a rotary movement of the hexagonal stirrer within the receptacle, or other device, which is connected to the rotor shaft. When the material within the receptacle has been sufficiently mixed it is merely necessary to remove the receptacle from the stator and empty the contents. Inasmuch as the receptacle carrying the rotor is entirely independent of the base it can be readily washed and cleaned without the necessity of care which is required in the attendance of usual drink mixing devices.

It will also be noted that no oiling of the rotor shaft is required, and, consequently, the device is much cleaner than usual types of machines. It will also be observed that a drink mixer of this character is much more compact and more pleasing in appearance than usual devices of this character.

It will be understood that the embodiment of the invention disclosed herein is illustrative and not restrictive and that the invention contemplates the use of a substantially flat stator and co-operating disk-like rotor in any type of apparatus for which the same may be adapted. It will be remembered that the term "flat" as applied to the stator and "disk-like" as applied to the rotor is intended to include devices presenting convex or concave surfaces, or other surfaces which more or less approach flat surfaces as distinguished from the usual cylindrical type of rotor and its complementary stator.

Having thus described our invention, what we claim as new, and desire to secure by Letters Patent, is:

1. A device of the class described comprising independent complementary members one of which embodies a substantially flat stator of an induction motor having flat radial field windings extending in substantial parallelism with the face of the stator, and the other member of which embodies a disk-like rotor adapted when juxtaposed coaxially upon said stator to establish a relation between said stator and rotor operable to cause a suitable current imposed upon the field windings of said stator to actuate said rotor and means operable by the rotation of said rotor.

2. A device of the class described comprising independent complementary members one of which embodies a substantially flat stator of an induction motor having flat radially disposed field windings extending in substantial parallelism with the face of the stator, a laminated core underlying said field windings, and the other member of which embodies a disk-like rotor adapted when juxtaposed coaxially upon said stator to establish a relation between said stator and rotor operable to cause a suitable current imposed upon the field windings of said stator to actuate said rotor and means operable by the rotation of said rotor.

3. A device of the class described comprising independent complementary members one of which embodies a substantially flat stator, having flat radially disposed polyphase field windings lying in planes parallel with the face of the stator, and the other member of which embodies a disk-like rotor adapted when juxtaposed coaxially upon said stator to establish a relation between said stator and rotor operable to cause a polyphase current impressed upon the field windings of said stator to actuate said rotor and means operable by the rotation of said rotor.

4. A device of the class described comprising a base member, having a stator of an induction motor, presenting a substantially flat surface and provided with radially disposed field windings in parallelism with the face of the stator, means for supplying a suitable electric current thereto, a member, independent of said base adapted to be superimposed thereupon, having a shaft rotatably journalled in its bottom, a disk-like rotor complementary to said stator, secured to said shaft, operable when juxtaposed coaxially upon said stator to establish an electrical relation to said stator which will cause an electric current imposed upon said stator to actuate said rotor and a device secured to and operable by said rotor shaft.

5. A device of the class described comprising a base member, having a stator of an induction motor, and presenting a substantially flat surface, provided with flat radial polyphase field windings lying in planes parallel with the face of the stator, means for supplying a polyphase current thereto, and a member, independent of said base adapted to be movably superimposed upon said base, having a shaft rotatably journalled in said bearing, a skeletonized disk-like rotor secured to said shaft operable when juxtaposed coaxially upon said stator to establish an electrical relation to said stator which will cause the electric current imposed upon said stator to actuate said rotor and its shaft and a device operable by the rotation of said shaft.

6. A device of the class described comprising a base having embedded therein the stator of an induction motor provided with suitable flat field windings lying parallel with the face of the stator and presenting a substantially flat upper surface and a removable member having a recessed under face, a shaft rotatably journalled in said base, a disk-like rotor secured to said shaft located in said recess and a device secured to and operable by said shaft.

In testimony whereof, we have signed our names to this specification.

EARL J. PILKINGTON.
FRANCIS A. OLMSTED.